United States Patent
Liu et al.

(10) Patent No.: US 8,531,119 B2
(45) Date of Patent: Sep. 10, 2013

(54) LIGHT EMITTING DIODE TUBE AND LIGHT EMITTING DIODE LAMP USING THE SAME

(75) Inventors: Yao-Sheng Liu, New Taipei (TW); Kwan Ho, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 101 days.

(21) Appl. No.: 13/311,571

(22) Filed: Dec. 6, 2011

(65) Prior Publication Data
US 2012/0194086 A1 Aug. 2, 2012

(30) Foreign Application Priority Data
Jan. 31, 2011 (TW) .............................. 100103746 A (51) Int. Cl.
*H05B 37/00* (2006.01)

(52) U.S. Cl.
USPC .................. 315/192; 315/185 R; 315/295

(58) Field of Classification Search
USPC ............. 315/192, 185 R, 119, 121–128, 186, 315/200 R, 201–204, 294, 295, 297, 307
See application file for complete search history.

(56) References Cited

U.S. PATENT DOCUMENTS

| | | | | |
|---|---|---|---|---|
| 8,459,829 B2 * | 6/2013 | Cao et al. | ................. | 362/217.14 |
| 8,459,831 B2 * | 6/2013 | Hsia et al. | ..................... | 362/221 |
| 2011/0260614 A1 * | 10/2011 | Hartikka et al. | ................. | 315/51 |
| 2012/0043892 A1 * | 2/2012 | Visser et al. | ................... | 315/121 |

FOREIGN PATENT DOCUMENTS

| | | |
|---|---|---|
| TW | 201102558 | 1/2011 |
| TW | M395982 | 1/2011 |
| WO | 2008136458 | 11/2008 |

OTHER PUBLICATIONS

"Office Action of Taiwan Counterpart Application", issued on May 7, 2013, p1-p7, in which the listed references were cited.
"Office Action of Japan Counterpart Application", issued on Apr. 16, 2013, p1-p2, in which the listed reference (WO2008136458) was cited.

* cited by examiner

*Primary Examiner* — James H Cho
(74) *Attorney, Agent, or Firm* — Jianq Chyun IP Office (57) ABSTRACT

A light emitting diode (LED) tube and an LED lamp using the same are provided. The LED tube is suitable for direct installation in a lamp holder which has a starter and a ballast. The LED tube includes an LED array, an LED driver, and a rectification-block diplexer. When the LED array is driven by the LED driver, the rectifier-block diplexer disables the starter and the ballast and at the same time receives and converts an AC power supply. Thus the rectifier-block diplexer provides an operating voltage to the LED driver. Without removing the starter and shorting the ballast, the user can easily install the LED tube into a traditional fluorescent lamp socket, saving the cost of lamp modification, thus achieving the purpose of energy saving and environmental protection.

22 Claims, 12 Drawing Sheets

LIGHT EMITTING DIODE TUBE AND LIGHT EMITTING DIODE LAMP USING THE SAME

CROSS-REFERENCE TO RELATED APPLICATION

This application claims the priority benefit of Taiwan application serial no. 100103746, filed on Jan. 31, 2011. The entirety of the above-mentioned patent application is hereby incorporated by reference herein and made a part of this specification.

BACKGROUND OF THE INVENTION

1. Field of the Invention

The disclosure is related to a light source, and in particular to a tube and a lamp.

2. Description of Related Art

As semiconductor technologies advance, brightness and efficiency of light emitting diodes (LEDs) continue to increase. LEDs are a new type of cold light source and have advantages such as long life span, small volume, low power consumption, low pollution, high reliability, and being suitable for mass production. LEDs are able to be applied in a wide range of fields.

Figure 1:
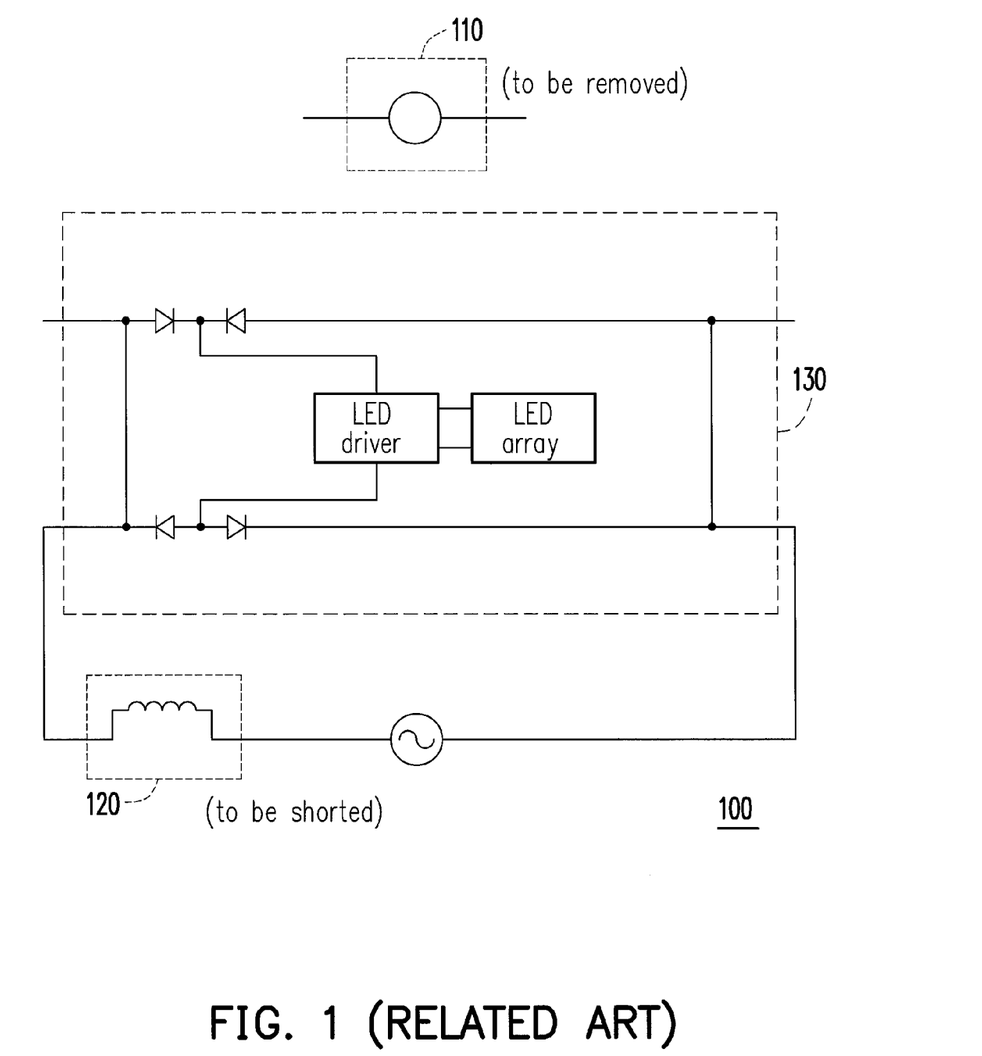
FIG. 1 is a schematic diagram showing conventional installation of an LED tube.

Conventional fluorescent lamps are most widely used in households and for commercial applications. However, current LED tubes cannot directly replace fluorescent tubes, so that a bottleneck in the development of green technologies has been reached. FIG. 1 is a schematic diagram showing conventional installation of an LED tube. Please refer to FIG. 1. If an LED tube 130 is to replace an existing fluorescent tube, a starter 110 of a lamp 100 must be additionally removed and a ballast 120 must be shorted. Since revamping the lamp requires additional cost and a great amount of time, the LED tube 130 cannot be easily installed, thereby hindering the development of green technologies.

An issue to be solved is the inconvenience in installing LED tubes, so as to realize an LED tube that is able to be installed in the following manner similar to that of a fluorescent tube. Electrode columns of the LED tube are inserted into the lamp holder, and the LED tube is rotated until it is positioned, so that the LED tube is easily installed.

SUMMARY OF THE INVENTION

The disclosure provides an LED tube and an LED lamp using the same. When the LED tube is installed in a lamp holder, there is no need to remove a starter or short a ballast, so that a user can easily install the LED tube.

The disclosure provides an LED tube, suitable for being directly installed in a lamp holder which includes a starter and a ballast. The LED tube includes an LED array, an LED driver, and a rectification-block diplexer. The LED driver is coupled to the LED array, so as to be operated under an operating voltage to drive the LED array. The rectification-block diplexer is individually connected to the starter and the ballast and is coupled to the LED driver. When the LED driver drives the LED array, the rectification-block diplexer is used to disable the starter and the ballast and at the same time receives and converts an AC power supply, so as to provide the operating voltage to the LED driver.

The disclosure further provides an LED lamp which includes a lamp holder and an LED tube. The lamp holder includes a starter and a ballast. The LED tube is suitable for direct installation on the lamp holder. The LED tube includes an LED array, an LED driver, and a rectification-block diplexer. The LED driver is coupled to the LED array, so as to be operated under an operating voltage to drive the LED array. The rectification-block diplexer is individually connected to the starter and the ballast in parallel is and coupled to the LED driver, when the LED driver drives the LED array, the rectification-block diplexer is used to disable the starter and the ballast and at the same time receives and converts an AC power supply, so as to provide the operating voltage to the LED driver.

According to an embodiment of the disclosure, the rectification-block diplexer includes: a first rectifying unit which includes a first terminal, a second terminal, and a third terminal; a second rectifying unit which includes a fourth terminal and a fifth terminal, wherein the third terminal is coupled to the fourth terminal; a third rectifying unit which includes a sixth terminal and a seventh terminal; and a fourth rectifying unit which includes an eighth terminal, a ninth terminal, and a tenth terminal, wherein the seventh terminal is coupled to the eighth terminal. Two terminals of the starter are respectively connected to the second terminal and the ninth terminal in parallel, and the ballast is connected to the fourth terminal and the seventh terminal in parallel through the AC power supply.

According to an embodiment of the disclosure, the LED driver includes a first input terminal and a second input terminal, so as to receive the operating voltage, the first input terminal is coupled to the first terminal and the tenth terminal, and the second input terminal is coupled to the fifth terminal and the sixth terminal.

According to an embodiment of the disclosure, the first rectifying unit includes a first diode and a second diode. The second rectifying unit includes a third diode, a cathode of the first diode is coupled to the first terminal, an anode of the first diode and a cathode of the second diode are coupled to the second terminal, an anode of the second diode is coupled to the third terminal, a cathode of the third diode is coupled to the fourth terminal, and an anode of the third diode is coupled to the fifth terminal.

According to an embodiment of the disclosure, the third rectifying unit includes a fourth diode, the fourth rectifying unit includes a fifth diode and a sixth diode, an anode of the fourth diode is coupled to the sixth terminal, a cathode of the fourth diode is coupled to the seventh terminal, an anode of the fifth diode is coupled to the eighth terminal, a cathode of the fifth diode and an anode of the sixth diode are coupled to the ninth terminal, and a cathode of the sixth diode is coupled to the tenth terminal.

According to an embodiment of the disclosure, the first rectifying unit includes a first diode and a second diode, the second rectifying unit includes a third diode, an anode of the first diode is coupled to the first terminal, a cathode of the first diode and an anode of the second diode are coupled to the second terminal, a cathode of the second diode is coupled to the third terminal, an anode of the third diode is coupled to the fourth terminal, and a cathode of the third diode is coupled to the fifth terminal.

According to an embodiment of the disclosure, the third rectifying unit includes a fourth diode, the fourth rectifying unit includes a fifth diode and a sixth diode, a cathode of the fourth diode is coupled to the sixth terminal, an anode of the fourth diode is coupled to the seventh terminal, a cathode of the fifth diode is coupled to the eighth terminal, an anode of the fifth diode and a cathode of the sixth diode are coupled to the ninth terminal, and an anode of the sixth diode is coupled to the tenth terminal.

According to an embodiment of the disclosure, the rectification-block diplexer includes: a first rectifying unit which includes a first terminal, a second terminal, a third terminal, and a fourth terminal; and a second rectifying unit which includes a fifth terminal, a sixth terminal, a seventh terminal, and an eighth terminal. Two terminals of the starter are respectively connected to the first terminal and the third terminal in parallel, and the ballast is connected to the fifth terminal and the seventh terminal in parallel through the AC power supply.

According to an embodiment of the disclosure, the LED driver includes a first input terminal and a second input terminal, so as to receive the operating voltage, the first input terminal is coupled to the fourth terminal and the eighth terminal, and the second input terminal is coupled to the second terminal and the sixth terminal.

According to an embodiment of the disclosure, the first rectifying unit includes a first diode, a second diode, a third diode, and a fourth diode, an anode of the first diode and a cathode of the second diode are coupled to the first terminal, an anode of the second diode and an anode of the third diode are coupled to the second terminal, a cathode of the third diode and an anode of the fourth diode are coupled to the third terminal, and a cathode of the first diode and a cathode of the fourth diode are coupled to the fourth terminal.

According to an embodiment of the disclosure, the second rectifying unit includes a fifth diode, a sixth diode, and a seventh diode, and an eighth diode, an anode of the fifth diode and a cathode of the sixth diode are coupled to the fifth terminal, an anode of the sixth diode and an anode of the seventh diode are coupled to the sixth terminal, a cathode of the seventh diode and an anode of the eighth diode are coupled to the seventh terminal, and a cathode of the fifth diode and a cathode of the eighth diode are coupled to the eighth terminal.

In light of the above, when the LED tube according to embodiments of the disclosure is used to replace a conventional fluorescent tube, there is no need to remove the starter or short the ballast when installing the LED tube in the lamp holder. Therefore, the user can easily install the LED tube, thus achieving the purpose of energy saving and environmental protection.

In order to make the aforementioned and other objects, features and advantages of the disclosure comprehensible, embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

The following refers to exemplary embodiments of the disclosure in detail and illustrates examples of the exemplary embodiments in the accompanying drawings. In addition, whenever possible, the same reference numerals in the figures and embodiments represent same or similar elements.

Figure 2:
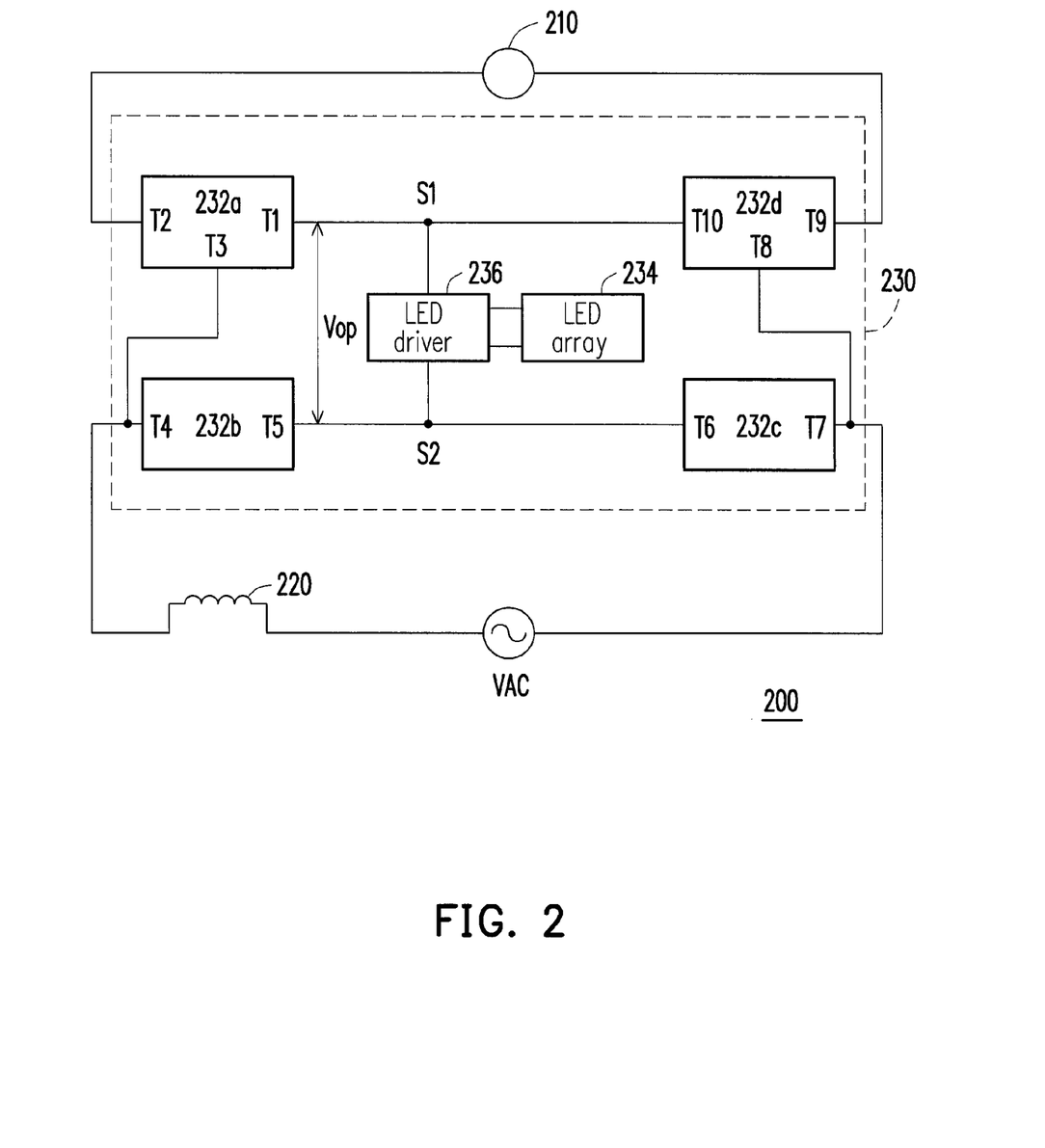
FIG. 2 is a schematic circuit diagram showing an LED lamp according to an embodiment of the disclosure.

FIG. 2 is a schematic circuit diagram showing an LED lamp according to an embodiment of the disclosure. Please refer to FIG. 2. An LED lamp 200 may include an LED tube 230 and a lamp holder which includes a starter 210 and a ballast 220. The LED tube 230 is suitable for direct installation on the lamp holder. The LED tube 230 may include an LED array 234, an LED driver 236, and a rectification-block diplexer. The rectification-block diplexer may be formed by rectifying units 232a-232d, but the disclosure is not limited to this configuration. The LED driver 236 may be coupled to the LED array 234. The LED driver 236 may be operated under an operating voltage Vop to drive the LED array 234. The rectification-block diplexer (which may be formed by the rectifying units 232a-232d) may be individually connected to the starter 210 and the ballast 220 in parallel and is coupled to the LED driver 236. When the LED array 234 is driven by the LED driver 236, the rectification-block diplexer is able to disable the starter 210 and the ballast 220 and at the same time receive and convert an AC power supply VAC, so as to provide the operating voltage Vop to the LED driver 236. Thus the LED driver 236 is able to drive the LED array 234.

A detailed structure of the rectification-block diplexer may be as that described below, but the disclosure is not limited to this configuration. The rectifying unit 232a may include a first terminal T1, a second terminal T2, and a third terminal T3. The rectifying unit 232b may include a fourth terminal T4 and a fifth terminal T5, wherein the third terminal T3 is coupled to the fourth terminal T4. The rectifying unit 232c may include a sixth terminal T6 and a seventh terminal T7. The rectifying unit 232d may include an eighth terminal T8, a ninth terminal T9, and a tenth terminal T10, wherein the seventh terminal T7 is coupled to the eighth terminal T8. Two terminals of the starter 210 are respectively connected to the second terminal T2 and the ninth terminal T9 in parallel, and the ballast 220 may be connected to the fourth terminal T4 and the seventh terminal T7 in parallel through the AC power supply VAC. The ballast 220 and the AC power supply VAC may be switched in position.

The LED driver 236 has a first input terminal S1 and a second input terminal S2, so as to receive the operating voltage Vop. The first input terminal S1 is coupled to the first terminal T1 and the tenth terminal T10, and the second input terminal S2 is coupled to the fifth terminal T5 and the sixth terminal T6. According to the rectification-block diplexer described above, the second terminal T2 and the ninth terminal T9 of the LED tube 230 are respectively connected to the two terminals of the starter 210 in parallel. The fourth terminal T4 of the LED tube 230 is coupled to a terminal of the ballast 220, and another terminal of the ballast 220 is connected to the seventh terminal T7 in parallel through the AC power supply VAC.

In the LED tube 230, the rectifying units 232a-232d in the rectification-block diplexer are capable of converting the AC power supply VAC to a direct current (DC) power supply. The LED array 234 may be formed by a plurality of LEDs, and the LED driver 236 may be an LED driver with up-to-date technologies. The LED driver 236 is able to receive the rectified DC power supply through the first input terminal S1 and the second input terminal S2, so as to drive the LED array 234. The main focus of the embodiments of the disclosure is not the detailed structure of the LED array 234 or the LED driver 236, and hence said structures are not redundantly described. In addition, the LED tube 230 may include a structure similar to an electrode column in a fluorescent tube, so that the second terminal T2 and the fourth terminal T4 form a first pair of electrode columns, and the seventh terminal T7 and the ninth terminal T9 form a second pair of electrode columns The LED tube 230 is installed in the following manner. A user may insert electrode columns of the LED tube 230 into the lamp holder (not shown) and rotate the LED tube 230 until it is positioned. Therefore, the user can easily replace the tube.

It should be noted that when the LED tube 230 is used to replace a conventional fluorescent lamp, there is no need to remove the starter 210 or short the ballast 220 when installing the LED tube 230 in the lamp holder.

Figure 3A:
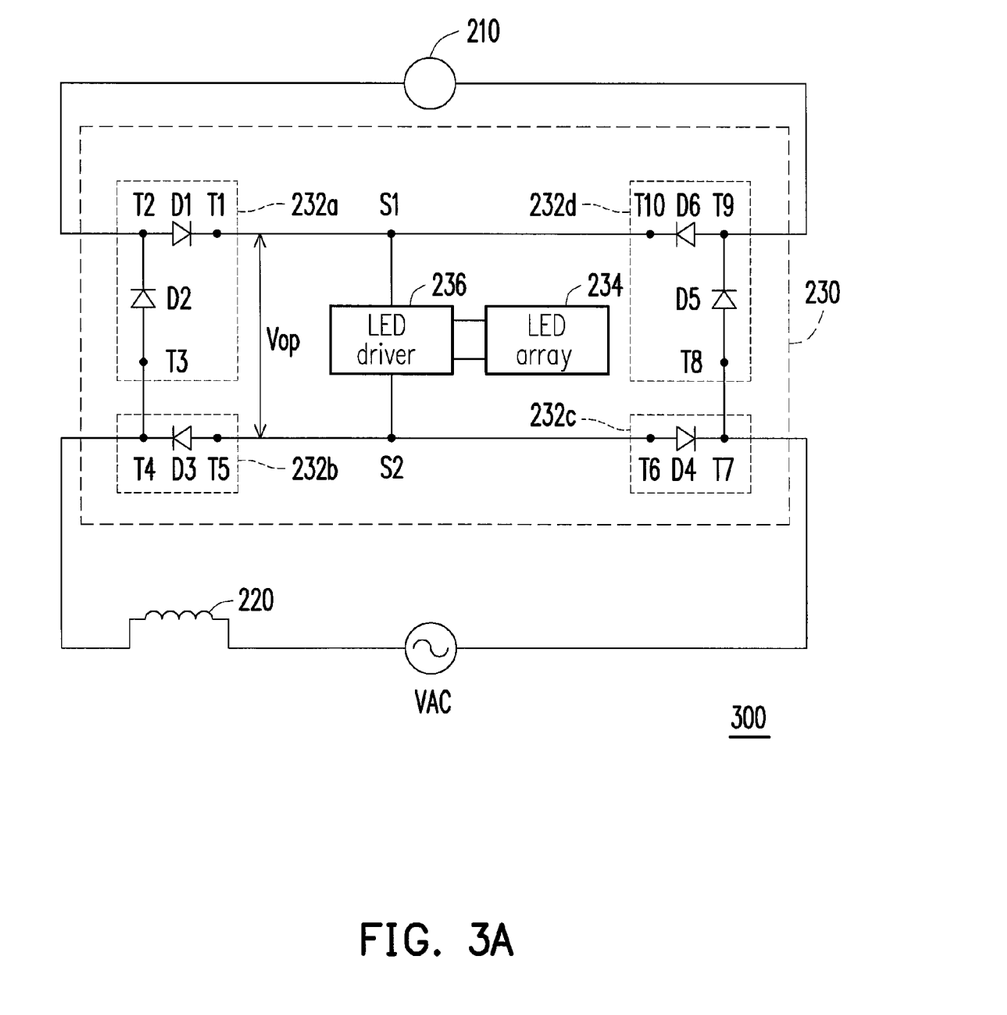
FIG. 3A is a schematic detailed circuit diagram showing the LED lamp according to the embodiment in FIG. 2.

According to the teachings in the above embodiment, FIG. 3A is a schematic detailed circuit diagram showing the LED lamp according to the embodiment in FIG. 2. Please refer to FIG. 3A. An LED lamp 300 has a structure the same as that of the LED lamp 200. Another embodiment illustrating the detailed structure of the rectification-block diplexer may be as that described below, but the disclosure is not limited to this configuration. The rectifying unit 232a may include diodes D1 and D2. The rectifying unit 232b may include a diode D3. A cathode of the diode D1 is coupled to the first terminal T1, an anode of the diode D1 and a cathode of the diode D2 are coupled to the second terminal T2, an anode of the diode D2 is coupled to the third terminal T3, a cathode of the diode D3 is coupled to the fourth terminal T4, and an anode of the diode D3 is coupled to the fifth terminal T5. The rectifying unit 232c may include a diode D4. The rectifying unit 232d may include diodes D5 and D6. An anode of the diode D4 is coupled to the sixth terminal T6, a cathode of the diode D4 is coupled to the seventh terminal T7, an anode of the diode D5 is coupled to the eighth terminal T8, a cathode of the diode D5 and an anode of the diode D6 are coupled to the ninth terminal T9, and a cathode of the diode D6 is coupled to the tenth terminal T10.

Figure 3B:
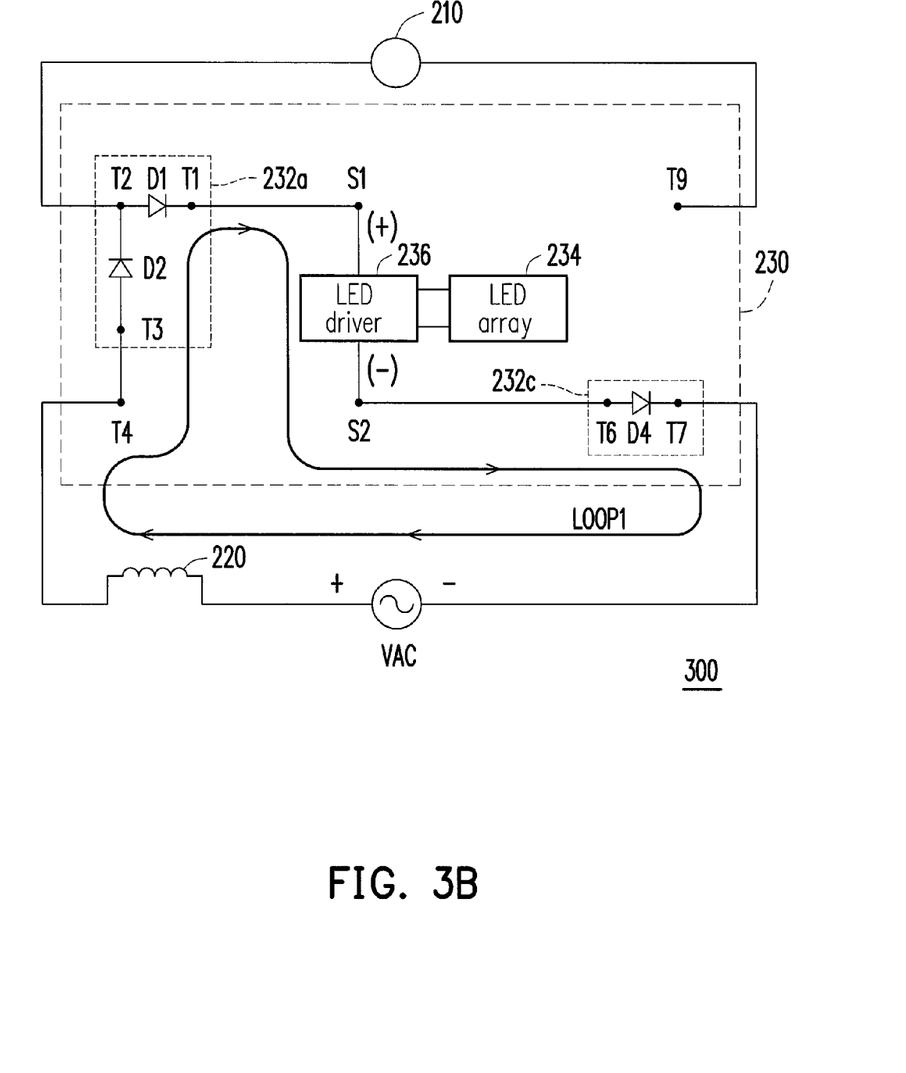
FIG. 3B and FIG. 3C are schematic rectifying diagrams of FIG. 3A.
Figure 3C:
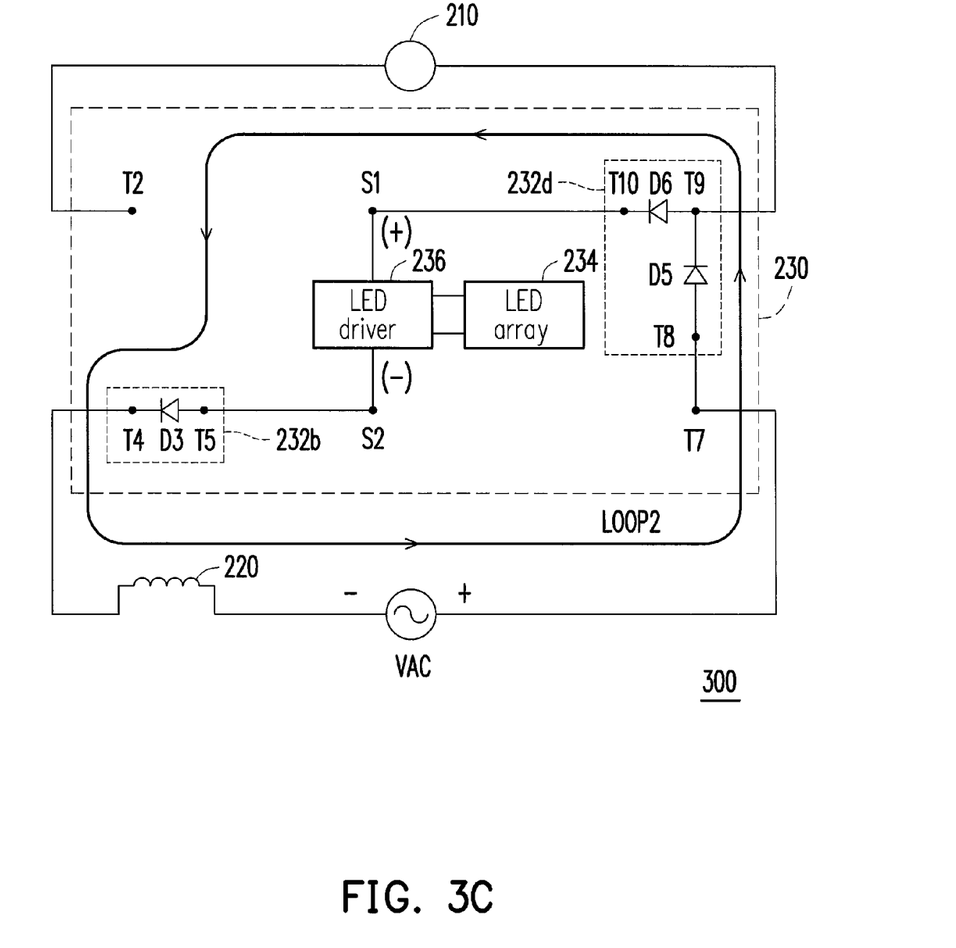

FIG. 3B and FIG. 3C are schematic rectifying diagrams of FIG. 3A. Please refer to FIG. 3B. A connecting path LOOP1 in a rectifying process of the AC power supply VAC may be as follows. The path starts from the inputted AC power supply VAC, goes through the ballast 220, the rectifying unit 232a, the LED driver 236, the rectifying unit 232c, and goes back to the inputted AC power supply VAC. Next, please refer to FIG. 3C. Another connecting path LOOP2 in the rectifying process of the AC power supply VAC may be as follows. The path starts from the inputted AC power supply VAC, goes through the rectifying unit 232d, the LED driver 236, the rectifying unit 232b, the ballast 220, and goes back to the inputted AC power supply VAC. When the AC power supply VAC is at an instant of phase transition and has a stable phase, voltage changes at the two terminals of the starter 210 may be less than a predetermined value (for example, the predetermined value is 2 V, but said value is not limited to this number). This causes the starter 210 to be incapable of being enabled, thus disabling the ballast 220. Therefore, the rectifying circuits 232a and 232d may make the voltage changes at the two terminals of the starter 210 less than the predetermined value, and the voltage is very small. Thus an effect similar to a short circuit is generated, thereby disabling the starter 210 and the ballast 220. Through illustration of FIGS. 3B and 3C and description of the present embodiment, the changes in the AC power supply VAC lead to the two connecting paths LOOP1 and LOOP2. Moreover, after the AC power supply VAC is rectified by the rectifying units 232a-232d, the operating voltage Vop is generated. The operating voltage Vop is an AC power supply which has a uniform current direction, and is able to be provided to the LED driver 236 to drive the LED array 234.

Figure 4A:
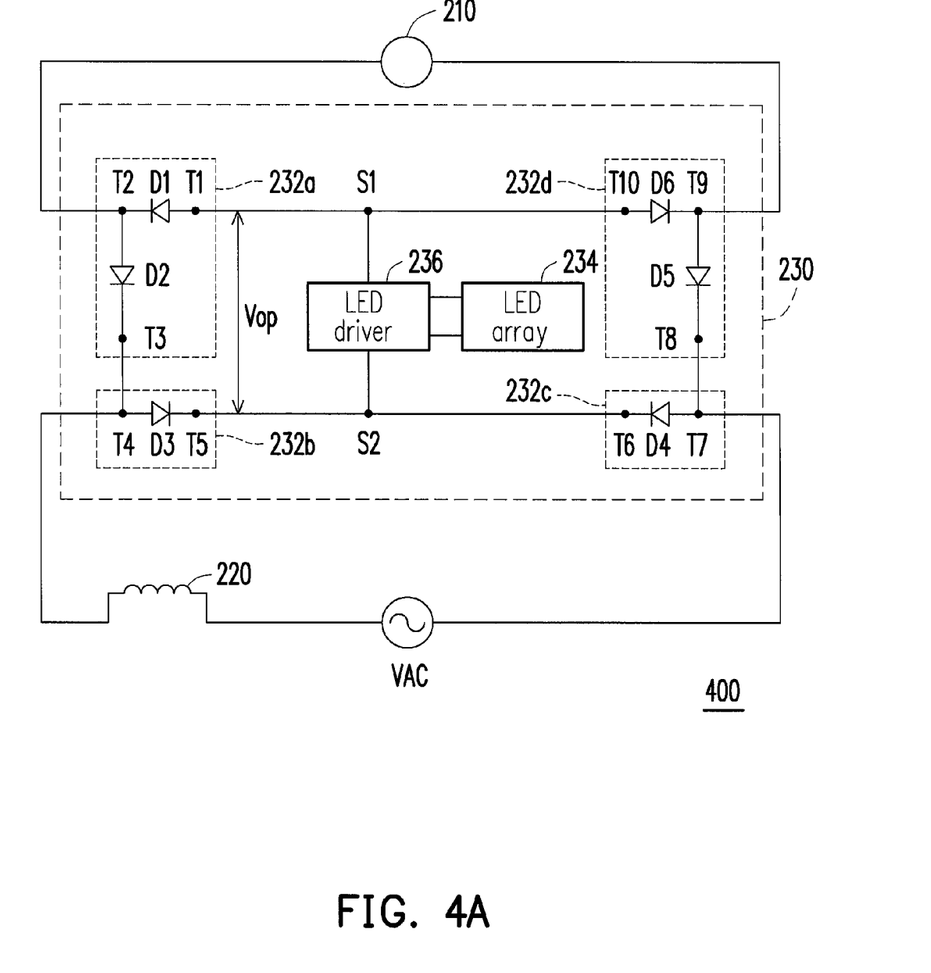
FIG. 4A is another schematic detailed circuit diagram showing the LED lamp according to the embodiment in FIG. 2.

According to the teachings in the above embodiment, FIG. 4A is another schematic detailed circuit diagram showing the LED lamp according to the embodiment in FIG. 2. Please refer to FIG. 4A. An LED lamp 400 has a structure same as that of the LED lamp 200, and the LED lamp 400 has the structure similar to that of the LED lamp 300. Another embodiment illustrating the detailed structure of the rectification-block diplexer may be as that described below, but the disclosure is not limited to this configuration. The rectifying unit 232a may include the diodes D1 and D2. The rectifying unit 232b may include the diode D3. The anode of the diode D1 is coupled to the first terminal T1, the cathode of the diode D1 and the anode of the diode D2 are coupled to the second terminal T2, the cathode of the diode D2 is coupled to the third terminal T3, the anode of the diode D3 is coupled to the fourth terminal T4, and the cathode of the diode D3 is coupled to the fifth terminal T5. The rectifying unit 232c may include the diode D4. The rectifying unit 232d may include the diodes D5 and D6. A cathode of the diode D4 is coupled to the sixth terminal T6, the anode of the diode D4 is coupled to the seventh terminal T7, the cathode of the diode D5 is coupled to the eighth terminal T8, the anode of the diode D5 and the cathode of the diode D6 are coupled to the ninth terminal T9, and the anode of the diode D6 is coupled to the tenth terminal T10. Through such an arrangement, an effect similar to that in the above embodiment is also achieved.

Figure 4B:
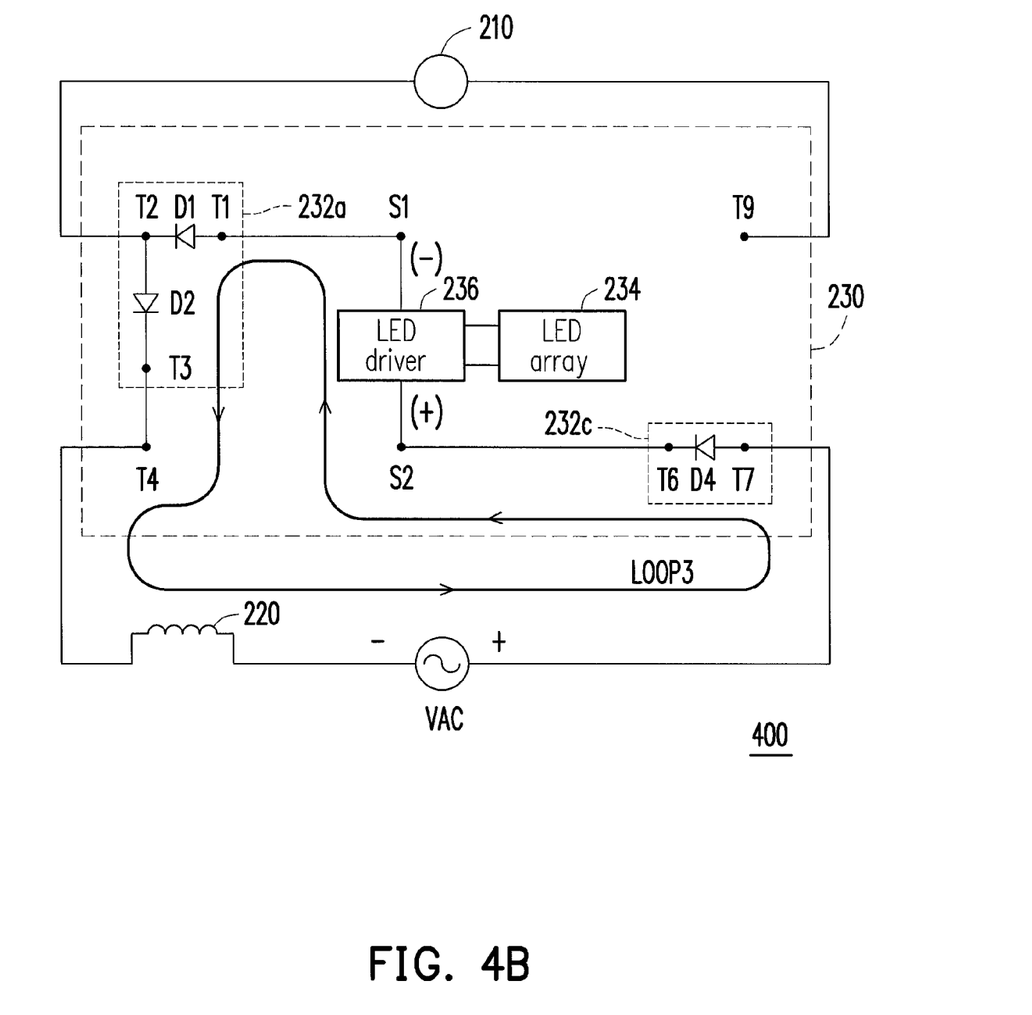
FIG. 4B and FIG. 4C are schematic rectifying diagrams of FIG. 4A.
Figure 4C:
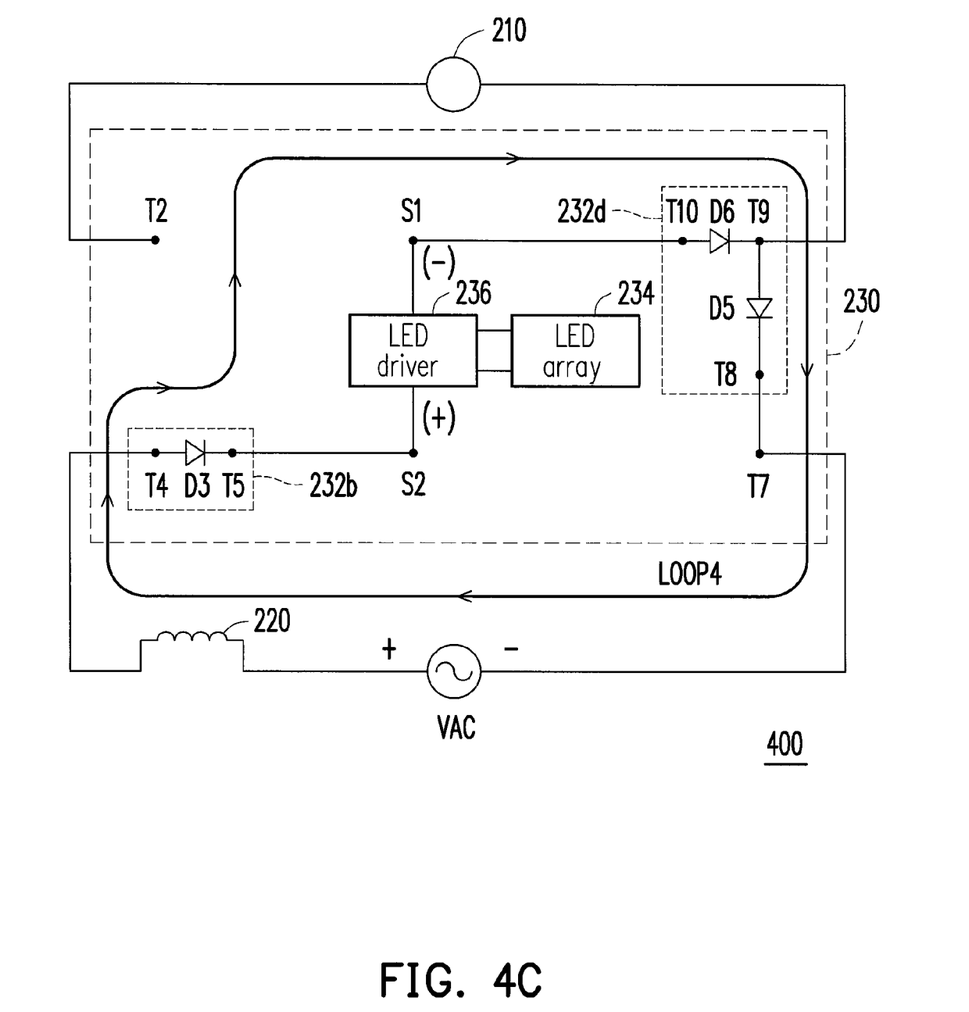

FIG. 4B and FIG. 4C are schematic rectifying diagrams of FIG. 4A. Please refer to FIG. 4B. A connecting path LOOP3 in the rectifying process of the AC power supply VAC may be as follows. The path starts from the inputted AC power supply VAC, goes through the rectifying unit 232c, the LED driver 236, the rectifying unit 232a, the ballast 220, and goes back to the inputted AC power supply VAC. Next, please refer to FIG. 4C. Another connecting path LOOP4 in the rectifying process of the AC power supply VAC may be as follows. The path starts from the inputted AC power supply VAC, goes through the ballast 220, the rectifying unit 232b, the LED driver 236, the rectifying unit 232d, and goes back to the inputted AC power supply VAC. When the AC power supply VAC is at the instant of phase transition and has a stable phase, the voltage changes at the two terminals of the starter 210 is less than the predetermined value (for example, the predetermined value is 2 V, but said value is not limited to this number). This causes the starter 210 to be incapable of being enabled, thus disabling the ballast 220. Therefore, the rectifying circuits 232a and 232d generate an effect similar to a short circuit at the two terminals of the starter 210, thus disabling the starter 210 and the ballast 220. Through illustration of FIGS. 4B and 4C and description of the present embodiment, the changes in the AC power supply VAC have the two connecting paths LOOP3 and LOOP4. Moreover, after the AC power supply VAC is rectified by the rectifying units 232a-232d, the operating voltage Vop is generated. The operating voltage Vop is an AC power supply which has a uniform current direction, and is able to be provided to the LED driver 236 to drive the LED array 234.

However, a difference between the present embodiment and the embodiment in FIG. 3A is the composition and arrangement in each of the diodes in the rectifying units 232a-232d. In addition, the LED tube 230 in FIGS. 3A and 4A may include a structure similar to an electrode column in a fluorescent tube, so that the second terminal T2 and the fourth terminal T4 form the first pair of electrode columns, and the seventh terminal T7 and the ninth terminal T9 form the second pair of electrode columns. The LED lamps in FIGS. 3A and 4A are only some of the selected embodiments, and the disclosure is not limited to these configurations.

Figure 5:
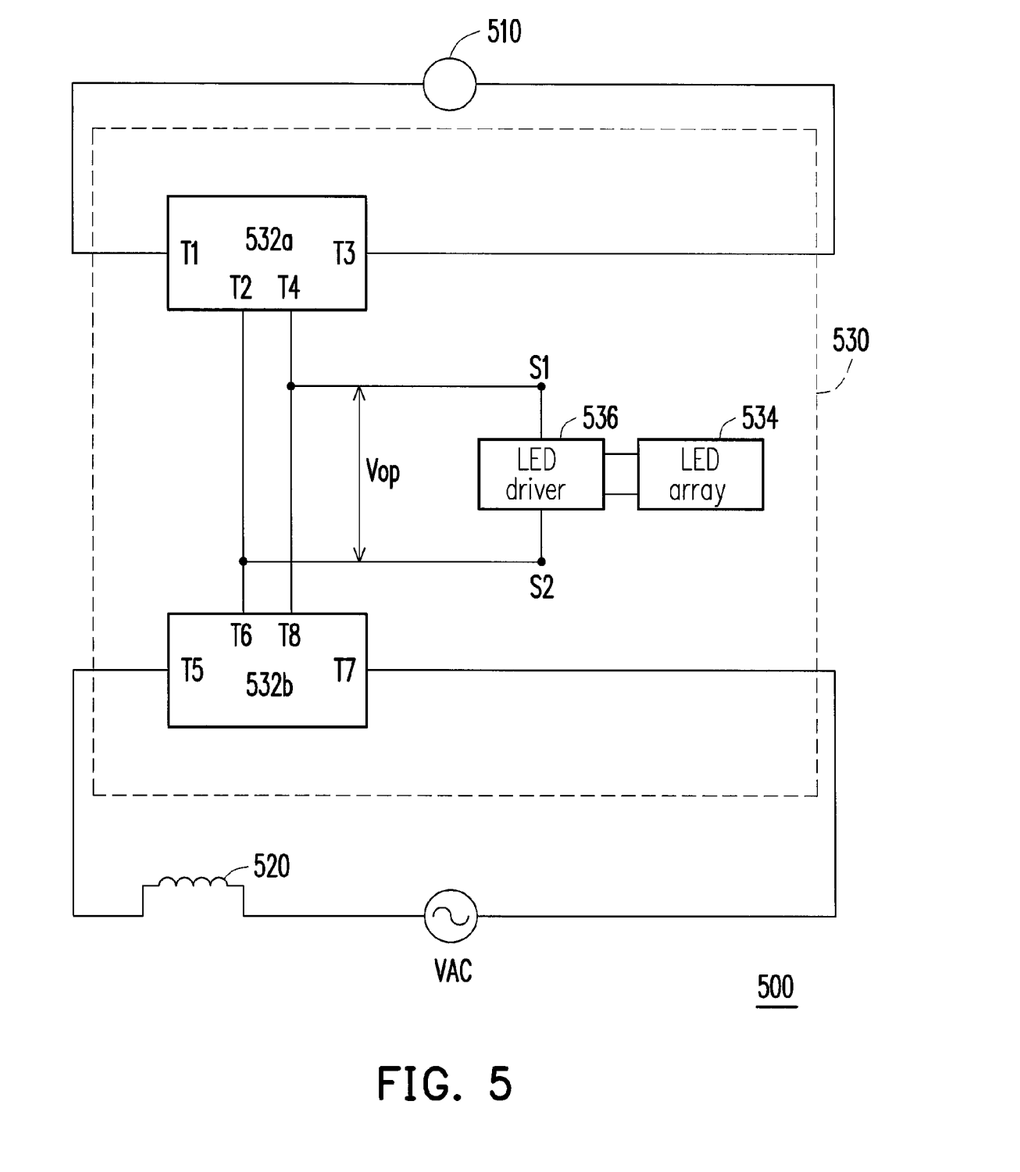
FIG. 5 is a schematic circuit diagram showing an LED lamp according to another embodiment of the disclosure.

FIG. 5 is a schematic circuit diagram showing an LED lamp according to another embodiment of the disclosure. Please refer to FIG. 5. An LED lamp 500 may include an LED tube 530 and a lamp holder which includes a starter 510 and a ballast 520. The LED tube 530 is suitable for direct installation on the lamp holder. The LED tube 530 may include an LED array 534, an LED driver 536, and a rectification-block diplexer. The rectification-block diplexer may be formed by the rectifying units 532a and 532b, but the disclosure is not limited to this configuration. The driver 536 may be coupled to the LED array 534. The LED driver 536 may be operated under the operating voltage Vop to drive the LED array 534. The rectification-block diplexer (which may be formed by the rectifying units 532a and 532b) may be individually connected to the starter 510 and the ballast 520 in parallel and is coupled to the LED driver 536. The rectification-block diplexer is able to disable the starter 510 and the ballast 520 and at the same time receive and convert the AC power supply VAC, so as to provide the operating voltage Vop to the LED driver 536. Thus the LED driver 536 is able to drive the LED array 534.

A detailed structure of the rectification-block diplexer according to the present embodiment may be as that described below, but the disclosure is not limited to this configuration. The rectifying unit 532a includes the first terminal T1, the second terminal T2, the third terminal T3, and the fourth terminal T4. The rectifying unit 532b includes the fifth terminal T5, the sixth terminal T6, the seventh terminal T7, and the eighth terminal T8. Two terminals of the starter 510 are respectively connected to the first terminal T1 and the third terminal T3 in parallel, and the ballast 520 may be connected to the fifth terminal T5 and the seventh terminal T7 in parallel through the AC power supply VAC. The ballast 520 and the AC power source VAC may be switched in position.

The LED driver 536 has the first input terminal S1 and the second input terminal S2, so as to receive the operating voltage Vop. The first input terminal S1 is coupled to the fourth terminal T4 and the eighth terminal T8, the second input terminal S2 is coupled to the second terminal T2 and the sixth terminal T6. According to the rectification-block diplexer described above, the first terminal T1 and the third terminal T3 of the LED tube 530 are respectively connected to the two terminals of the starter 510 in parallel. The fifth terminal T5 of the LED tube 530 is coupled to a terminal of the ballast 520, and another terminal of the ballast 520 is connected to the seventh terminal T7 in parallel through the AC power supply VAC.

In the LED tube 530, the rectifying units 532a and 532b in the rectification-block diplexer are capable of converting the AC power supply VAC to a DC power supply. The LED array 534 may be formed by a plurality of LEDs. The LED driver 536 may be an LED driver with up-to-date technologies. The LED driver 536 is able to receive the rectified DC power supply through the first input terminal S1 and the second input terminal S2, so as to drive the LED array 534. The main focus of the embodiments of the disclosure is not the detailed structure of the LED array 534 or the LED driver 536, and hence said structures are not redundantly described. In addition, the LED tube 530 may include a structure similar to an electrode column in a fluorescent tube, so that the first terminal T1 and the fifth terminal T5 form the first pair of electrode columns, and the third terminal T3 and the seventh terminal T7 form the second pair of electrode columns. The LED tube 530 is installed in the following manner. The user may insert electrode columns of the LED tube 530 into the lamp holder (not shown) and rotate the LED tube 530 until it is positioned. Therefore, the user can easily replace the tube.

It should be noted that when the LED tube 530 is used to replace a conventional fluorescent lamp, there is no need to remove the starter 510 or short the ballast 520 when installing the LED tube 530 in the lamp holder.

Figure 6A:
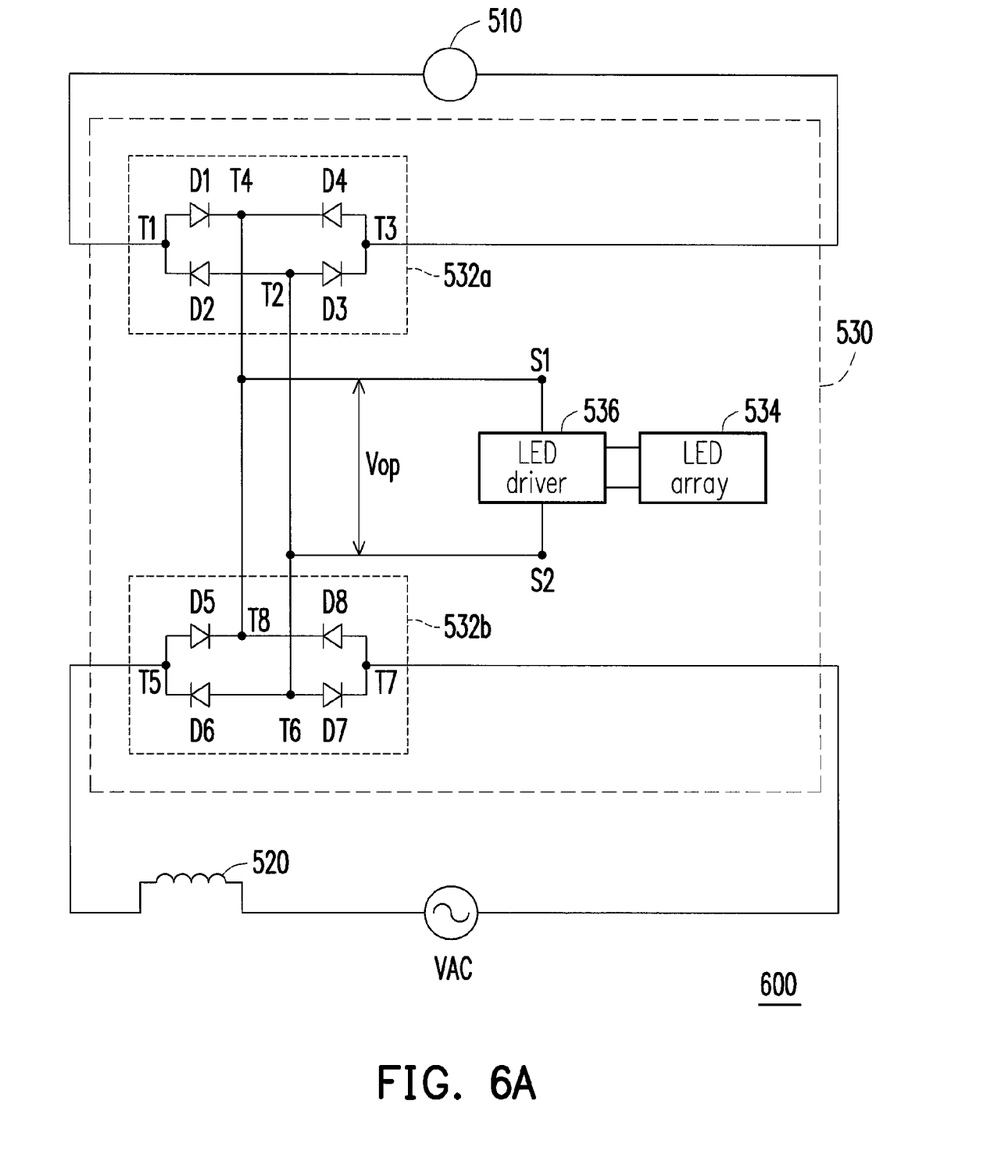
FIG. 6A is a schematic detailed circuit diagram showing the LED lamp according to the embodiment in FIG. 5.

According to the teachings in the above embodiment, FIG. 6A is a schematic detailed circuit diagram showing the LED lamp according to the embodiment in FIG. 5. Please refer to FIG. 6A. An LED lamp 600 has a structure the same as that of the LED lamp 500. Another embodiment illustrating the detailed structure of the rectification-block diplexer may be as that described below, but the disclosure is not limited to this configuration. The rectifying unit 532a may include the diodes D1-D4, wherein the anode of the diode D1 and the cathode of the diode D2 are coupled to the first terminal T1, the anode of the diode D2 and the anode of the diode D3 are coupled to the second terminal T2, the cathode of the diode D3 and the anode of the diode D4 are coupled to the third terminal T3, the cathode of the diode D1 and the cathode of the diode D4 are coupled to the fourth terminal T4. The rectifying unit 532b may include the diodes D5-D8, wherein the anode of the diode D5 and the cathode of the diode D6 are coupled to the fifth terminal T5, the anode of the diode D6 and the anode of the diode D7 are coupled to the sixth terminal T6, the cathode of the diode D7 and the anode of the diode D8 are coupled to the seventh terminal T7, the cathode of the diode D5 and the cathode of the diode D8 are coupled to the eighth terminal T8. The LED lamp 600 in FIG. 6A is only a selected embodiment, and the disclosure is not limited to this configuration.

Figure 6B:
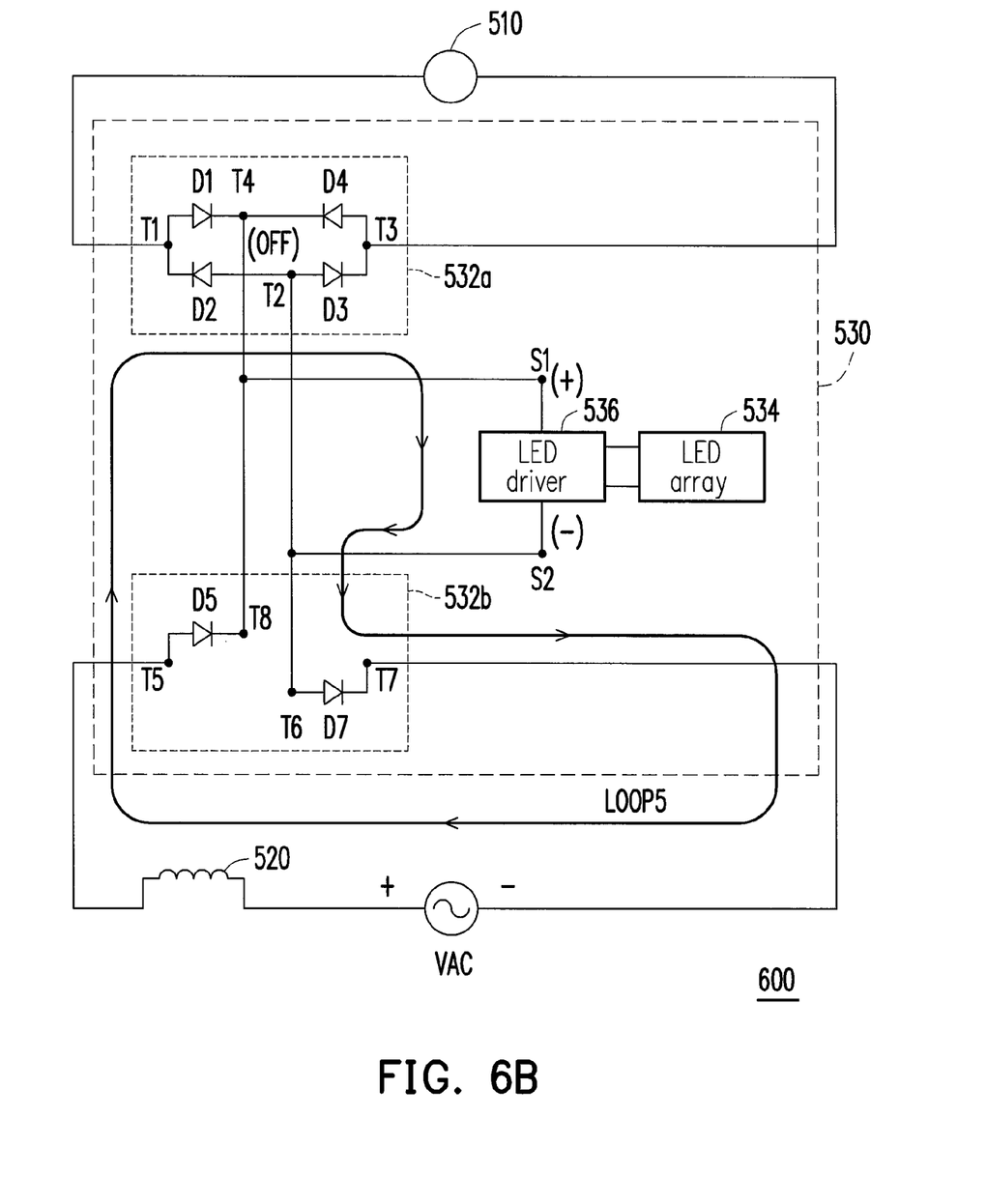
FIG. 6B and FIG. 6C are schematic rectifying diagrams of FIG. 6A.
Figure 6C:
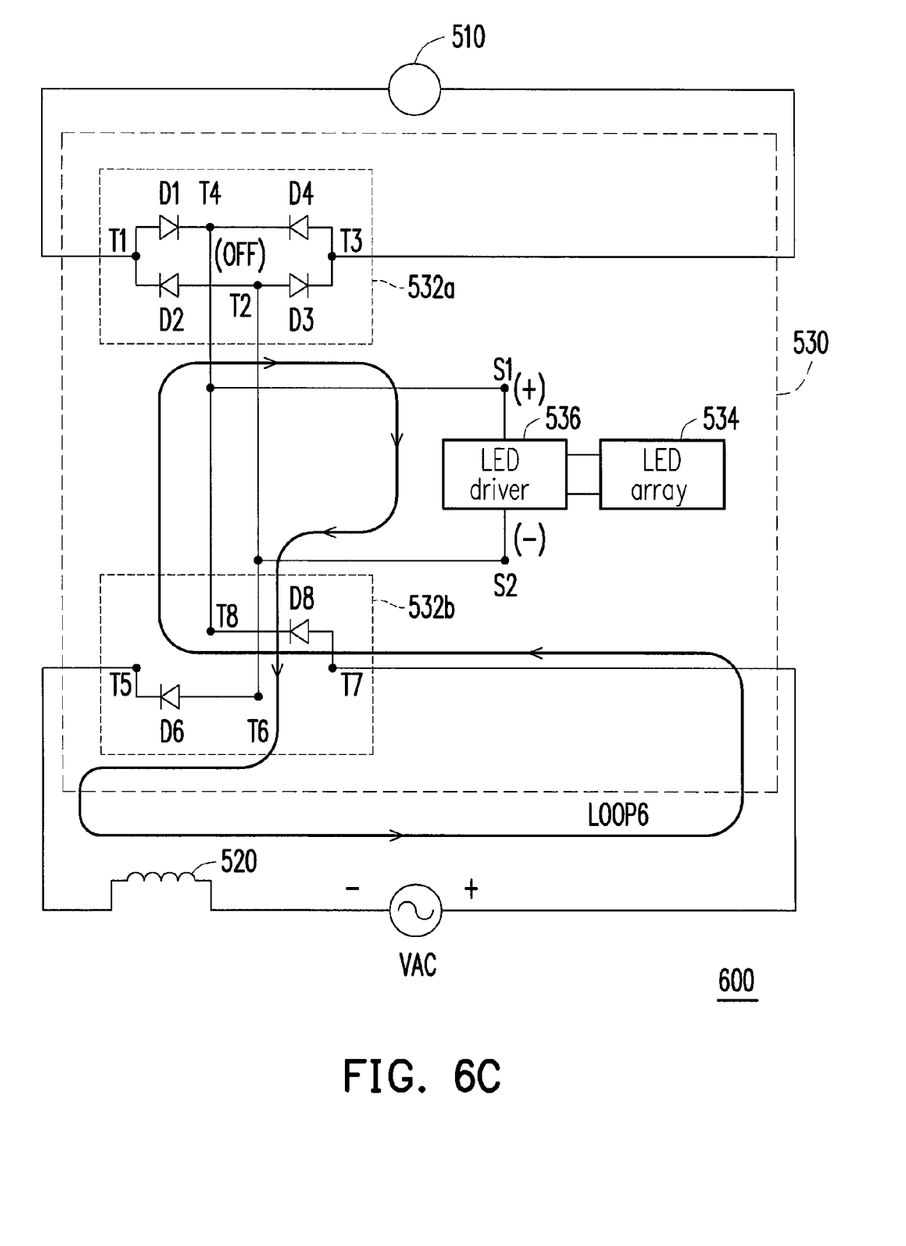

FIG. 6B and FIG. 6C are schematic rectifying diagrams of FIG. 6A. Please refer to FIG. 6B. A connecting path LOOP5 in the rectifying process of the AC power supply VAC may be as follows. The path starts from the inputted AC power supply VAC, goes through the ballast 520, the diode D5, the LED driver 536, the diode D7, and goes back to the inputted AC power supply VAC. Next, please refer to FIG. 6C. Another connecting path LOOP6 in the rectifying process of the AC power supply VAC may be as follows. The path starts from the inputted AC power supply VAC, goes through the diode D8, the LED driver 536, the diode D6, the ballast 520, and goes back to the inputted AC power supply VAC. Through illustration of FIGS. 6B and 6C and description of the present embodiment, each of the diodes in the rectifying unit 532a are off, so that effects of an open circuit are generated at two terminals of the starter 510. This causes the starter 510 to be incapable of being enabled, thus disabling the starter 510 and the ballast 520. Changes in the AC power supply VAC lead to the two connecting paths LOOP5 and LOOP6. Moreover, after the AC power supply VAC is rectified by the rectifying unit 532b, the operating voltage Vop is generated. The operating voltage Vop is an AC power supply which has a uniform current direction, and is able to be provided to the LED driver 536 to drive the LED array 534.

The LED tubes according to each of the embodiments in the present disclosure of "LIGHT EMITTING DIODE TUBE AND LIGHT EMITTING DIODE LAMP USING THE SAME" may have structures similar to electrode columns in fluorescent tubes.

Using the LED tube according to embodiments of the disclosure as an example, circuits of conventional lamp holders all have starters and ballasts and are able to be assembled with the LED tube according to embodiments of the disclosure without adjustments to the circuits.

As described above, the disclosure provides a simplified LED tube and a circuit structure of an LED lamp. Through an ingenious arrangement of the rectification-block diplexer, the LED driver, and the LED array, easy-to-install characteristics of the tube are retained.

In summary, the LED tube according to embodiments of the disclosure is able to be used to replace a conventional fluorescent lamp, and there is no need to remove the starter or short the ballast when installing the LED tube in the lamp holder. Therefore, the user can easily install the LED tube, thus achieving the purpose of energy saving and environmental protection.

It will be apparent to those skilled in the art that various modifications and variations can be made to the disclosure without departing from the scope or spirit of the disclosure. In view of the foregoing, it is intended that the disclosure cover modifications and variations of this disclosure provided they fall within the scope of the following claims and their equivalents.

What is claimed is:

1. A light-emitting diode (LED) tube, suitable for being installed in a lamp holder which comprises a starter and a ballast, the LED tube comprising:
   an LED array;
   an LED driver, coupled to the LED array, so as to be operated under an operating voltage to drive the LED array; and
   a rectification-block diplexer, individually connected to starter and the ballast in parallel and coupled to the LED driver, when the LED driver drives the LED array, the rectification-block diplexer disables the starter and the ballast and at the same time receives and converts an alternating current (AC) power supply, so as to provide the operating voltage to the LED driver.

2. The LED tube as claimed in claim 1, wherein the rectification-block diplexer comprises:
   a first rectifying unit, comprising a first terminal, a second terminal, and a third terminal;
   a second rectifying unit, comprising a fourth terminal and a fifth terminal, wherein the third terminal is coupled to the fourth terminal;
   a third rectifying unit, comprising a sixth terminal and a seventh terminal; and
   a fourth rectifying unit, comprising an eighth terminal, a ninth terminal, and a tenth terminal, wherein the seventh terminal is coupled to the eighth terminal;
   wherein two terminals of the starter are respectively connected to the second terminal and the ninth terminal in parallel, and the ballast is connected to the fourth terminal and the seventh terminal in parallel through the AC power supply.

3. The LED tube as claimed in claim 2, wherein the LED driver comprises a first input terminal and a second input terminal, so as to receive the operating voltage, the first input terminal is coupled to the first terminal and the tenth terminal, and the second input terminal is coupled to the fifth terminal and the sixth terminal.

4. The LED tube as claimed in claim 2, wherein the first rectifying unit comprises a first diode and a second diode, the second rectifying unit comprises a third diode, a cathode of the first diode is coupled to the first terminal, an anode of the first diode and a cathode of the second diode are coupled to the second terminal, an anode of the second diode is coupled to the third terminal, a cathode of the third diode is coupled to the fourth terminal, and an anode of the third diode is coupled to the fifth terminal.

5. The LED tube as claimed in claim 4, wherein the third rectifying unit comprises a fourth diode, the fourth rectifying unit comprises a fifth diode and a sixth diode, an anode of the fourth diode is coupled to the sixth terminal, a cathode of the fourth diode is coupled to the seventh terminal, an anode of the fifth diode is coupled to the eighth terminal, a cathode of the fifth diode and an anode of the sixth diode are coupled to the ninth terminal, and a cathode of the sixth diode is coupled to the tenth terminal.

6. The LED tube as claimed in claim 2, wherein the first rectifying unit comprises a first diode and a second diode, the second rectifying unit comprises a third diode, an anode of the first diode is coupled to the first terminal, a cathode of the first diode and an anode of the second diode are coupled to the second terminal, a cathode of the second diode is coupled to the third terminal, an anode of the third diode is coupled to the fourth terminal, and a cathode of the third diode is coupled to the fifth terminal.

7. The LED tube as claimed in claim 6, wherein the third rectifying unit comprises a fourth diode, the fourth rectifying unit comprises a fifth diode and a sixth diode, a cathode of the fourth diode is coupled to the sixth terminal, an anode of the fourth diode is coupled to the seventh terminal, a cathode of the fifth diode is coupled to the eighth terminal, an anode of the fifth diode and a cathode of the sixth diode are coupled to the ninth terminal, and an anode of the sixth diode is coupled to the tenth terminal.

8. The LED tube as claimed in claim 1, wherein the rectification-block diplexer comprises:
   a first rectifying unit, comprising a first terminal, a second terminal, a third terminal, and a fourth terminal; and
   a second rectifying unit, comprising a fifth terminal, a sixth terminal, a seventh terminal, and an eighth terminal;
   wherein two terminals of the starter are respectively connected to the first terminal and the third terminal in parallel, and the ballast is connected to the fifth terminal and the seventh terminal in parallel through the AC power supply.

9. The LED tube as claimed in claim 8, wherein the LED driver comprises a first input terminal and a second input terminal, so as to receive the operating voltage, the first input terminal is coupled to the fourth terminal and the eighth terminal, and the second input terminal is coupled to the second terminal and the sixth terminal.

10. The LED tube as claimed in claim 8, wherein the first rectifying unit comprises a first diode, a second diode, a third diode, and a fourth diode, an anode of the first diode and a cathode of the second diode are coupled to the first terminal, an anode of the second diode and an anode of the third diode are coupled to the second terminal, a cathode of the third diode and an anode of the fourth diode are coupled to the third terminal, and a cathode of the first diode and a cathode of the fourth diode are coupled to the fourth terminal.

11. The LED tube as claimed in claim 10, wherein the second rectifying unit comprises a fifth diode, a sixth diode, and a seventh diode, and an eighth diode, an anode of the fifth diode and a cathode of the sixth diode are coupled to the fifth terminal, an anode of the sixth diode and an anode of the seventh diode are coupled to the sixth terminal, a cathode of the seventh diode and an anode of the eighth diode are coupled to the seventh terminal, and a cathode of the fifth diode and a cathode of the eighth diode are coupled to the eighth terminal.

12. An LED lamp, comprising:
a lamp holder, comprising a starter and a ballast; and
an LED tube, suitable for being installed in the lamp holder, wherein the LED tube comprises:
  an LED array;
  an LED driver, coupled to the LED array, so as to be operated under an operating voltage to drive the LED array; and
  a rectification-block diplexer, individually connected to the starter and the ballast in parallel and coupled to the LED driver, when the LED driver drives the LED array, the rectification-block diplexer disables the starter and the ballast and at the same time receives and converts an AC power supply, so as to provide the operating voltage to the LED driver.

13. The LED lamp as claimed in claim 12, wherein the rectification-block diplexer comprises:
  a first rectifying unit, comprising a first terminal, a second terminal, and a third terminal;
  a second rectifying unit, comprising a fourth terminal and a fifth terminal, wherein the third terminal is coupled to the fourth terminal;
  a third rectifying unit, comprising a sixth terminal and a seventh terminal; and
  a fourth rectifying unit, comprising an eighth terminal, a ninth terminal, and a tenth terminal, wherein the seventh terminal is coupled to the eighth terminal;
  wherein two terminals of the starter are respectively connected to the second terminal and the ninth terminal in parallel, and the ballast is connected to the fourth terminal and the seventh terminal in parallel through the AC power supply.

14. The LED lamp as claimed in claim 13, wherein the LED driver comprises a first input terminal and a second input terminal, so as to receive the operating voltage, the first input terminal is coupled to the first terminal and the tenth terminal, and the second input terminal is coupled to the fifth terminal and the sixth terminal.

15. The LED lamp as claimed in claim 13, wherein the first rectifying unit comprises a first diode and a second diode, the second rectifying unit comprises a third diode, a cathode of the first diode is coupled to the first terminal, an anode of the first diode and a cathode of the second diode are coupled to the second terminal, an anode of the second diode is coupled to the third terminal, a cathode of the third diode is coupled to the fourth terminal, and an anode of the third diode is coupled to the fifth terminal.

16. The LED lamp as claimed in claim 15, wherein the third rectifying unit comprises a third diode and a fourth diode, the fourth rectifying unit comprises a fifth diode and a sixth diode, an anode of the fourth diode is coupled to the sixth terminal, a cathode of the fourth diode is coupled to the seventh terminal, an anode of the fifth diode is coupled to the eighth terminal, a cathode of the fifth diode and an anode of the sixth diode are coupled to the ninth terminal, and a cathode of the sixth diode is coupled to the tenth terminal.

17. The LED lamp as claimed in claim 13, wherein the first rectifying unit comprises a first diode and a second diode, the second rectifying unit comprises a third diode, an anode of the first diode is coupled to the first terminal, a cathode of the first diode and an anode of the second diode are coupled to the second terminal, a cathode of the second diode is coupled to the third terminal, an anode of the third diode is coupled to the fourth terminal, and a cathode of the third diode is coupled to the fifth terminal.

18. The LED lamp as claimed in claim 17, wherein the third rectifying unit comprises a fourth diode, the fourth rectifying unit comprises a fifth diode and a sixth diode, a cathode of the fourth diode is coupled to the sixth terminal, an anode of the fourth diode is coupled to the seventh terminal, a cathode of the fifth diode is coupled to the eighth terminal, an anode of the fifth diode and a cathode of the sixth diode are coupled to the ninth terminal, and an anode of the sixth diode is coupled to the tenth terminal.

19. The LED lamp as claimed in claim 12, wherein the rectification-block diplexer comprises:
  a first rectifying unit, comprising a first terminal, a second terminal, a third terminal, and a fourth terminal; and
  a second rectifying unit, comprising a fifth terminal, a sixth terminal, a seventh terminal, and an eighth terminal;
  wherein two terminals of the starter are respectively connected to the first terminal and the third terminal in parallel, and the ballast is connected to the fifth terminal and the seventh terminal in parallel through the AC power supply.

20. The LED lamp as claimed in claim 19, wherein the LED driver comprises a first input terminal and a second input terminal, so as to receive the operating voltage, the first input terminal is coupled to the fourth terminal and the eighth terminal, and the second input terminal is coupled to the second terminal and the sixth terminal.

21. The LED lamp as claimed in claim 19, wherein the first rectifying unit comprises a first diode, a second diode, a third diode, and a fourth diode, an anode of the first diode and a cathode of the second diode are coupled to the first terminal, an anode of the second diode and an anode of the third diode are coupled to the second terminal, a cathode of the third diode and an anode of the fourth diode are coupled to the third terminal, and a cathode of the first diode and a cathode of the fourth diode are coupled to the fourth terminal.

22. The LED lamp as claimed in claim 21, wherein the second rectifying unit comprises a fifth diode, a sixth diode, and a seventh diode, and an eighth diode, an anode of the fifth diode and a cathode of the sixth diode are coupled to the fifth terminal, an anode of the sixth diode and an anode of the seventh diode are coupled to the sixth terminal, a cathode of the seventh diode and an anode of the eighth diode are coupled to the seventh terminal, and a cathode of the fifth diode and a cathode of the eighth diode are coupled to the eighth terminal.

* * * * *